INVENTOR
JEAN-PIERRE A. PUGNAIRE
BY
Blair, Cesari & St. Onge
ATTORNEYS

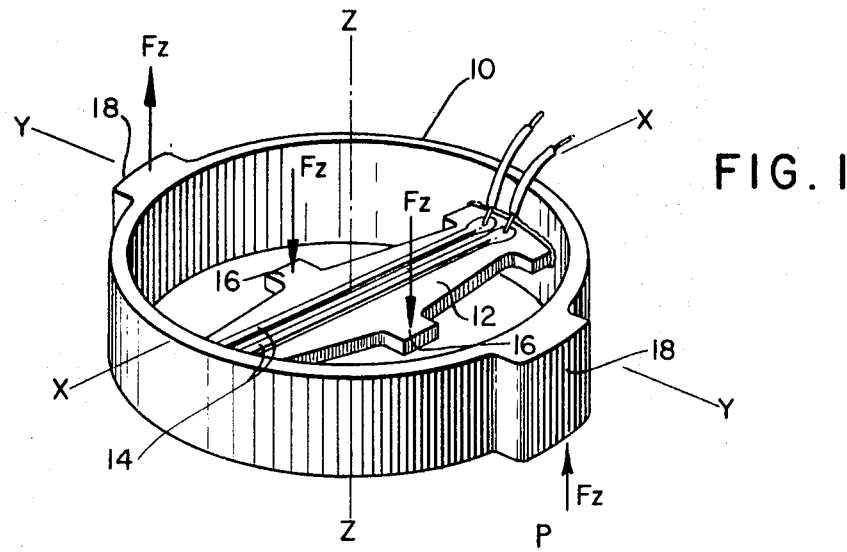
FIG. 1
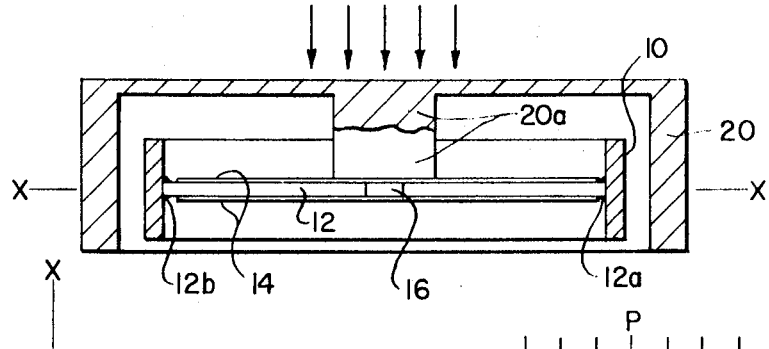
FIG. 2
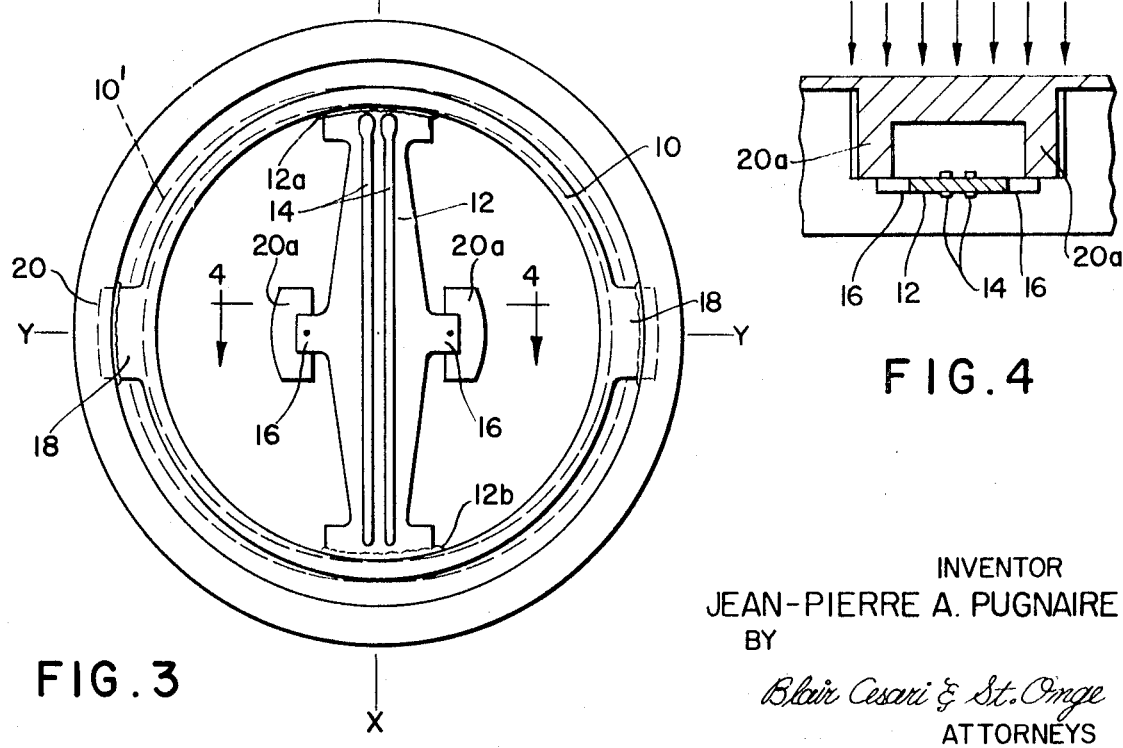
FIG. 3
FIG. 4
INVENTOR
JEAN-PIERRE A. PUGNAIRE
BY
Blair Cesari & St. Onge
ATTORNEYS Oct. 12, 1971  J. P. A. PUGNAIRE  3,611,797
STRAIN GAGE TRANSDUCER SENSING ELEMENT
Filed Feb. 2, 1970  5 Sheets-Sheet 4

United States Patent Office 3,611,797
Patented Oct. 12, 1971

3,611,797
STRAIN GAGE TRANSDUCER SENSING ELEMENT
Jean Pierre A. Pugnaire, Arlington, Mass., assignor to Bytrex, Inc., Waltham, Mass.
Continuation-in-part of application Ser. No. 827,529, May 26, 1969. This application Feb. 2, 1970, Ser. No. 7,728
Int. Cl. G01l 5/12, 9/00, 1/22
U.S. Cl. 73—141 A                                 10 Claims

ABSTRACT OF THE DISCLOSURE

A thin-walled, radially compliant, cylindrical ring carries a diametric beam to which strain gages are attached. A downward load is applied to the middle of the beam. A pair of tabs projecting laterally from opposite sides of the ring on an axis perpendicular to the beam axis support the transducer and the upward reaction force is applied to the ends of the beam solely through these tabs and the intervening portions of the ring.

RELATED APPLICATION

This application is a continuation-in-part of U.S. Ser. No. 827,529 filed May 26, 1969 by Jean-Pierre A. Pugnaire and entitled Strain Gage Transducer Sensing Element. This earlier-filed application is now abandoned.

BACKGROUND OF THE INVENTION

This invention relates to a beam type strain gage sensing element, and to a pressure transducer incorporating the element.

Sensing elements of this type are widely used to sense forces or the deflection of a pressure sensing diaphragm and emit electrical signals indicative of the force or deflection. Generally, they comprise a gaging beam which is supported at one or both ends and carries strain gages. When a load is applied to the beam, the beam deflects and absorbs strain energy. The amount of this energy is reflected in the output of a bridge circuit incorporating the strain gages.

In one prior type of transducer of which we are aware, shown in U.S. Pat. 2,979,680, the gaging beam is supported at its ends by a rigid cylindrical ring. The ring, in turn, rests on a suitable base. Thus, the ring is simply a support for the beam and its function is only to transmit reaction forces from the base directly to the beam ends.

This prior construction has two major drawbacks. First, due to the rigidity of the support ring, the beam deflects in the clamped-clamped mode. Thus, for a given active gage length and the same cross section and material, the beam must be twice as long and deflect twice as much as the element described in this invention to achieve the same electrical output.

The second problem attending these prior transducers can be traced to the mode of supporting the beam. More particularly, spurious forces are transmitted from the rigid ring to the beam which cause the associated strain gages to give a false reading of the applied load. These unwanted forces may arise, for example, because of ambient temperature changes which alter the ring diameter slightly or because of secondary interactions between the beam and the supporting ring due to stresses applied to the ring, i.e. in transducer parlance, case distortion sensitivity.

Accordingly, this invention aims to provide an improved element of the bridge-beam type whose output accurately reflects the applied load or deflection.

Another object of the invention is to provide an element of the above type having a relatively high sensitivity and small size.

Still another object of the invention is to provide an element of the above type which is relatively unresponsive to unwanted forces.

A further object of the invention is to provide an element of the above type whose output is relatively unaffected by ambient temperature changes.

Another objective of the invention is to provide an element which permits the use of different materials in its construction (materials with different coefficients of thermal expansion), preventing element failure at high temperature operations and providing accuracy at high temperature. For instance, the beam itself can be made of silicon brazed to the metal ring.

A further object of the invention is to provide an element of the above type which is relatively rugged and durable and has a long useful life.

A still further object is to provide a pressure transducer having the foregoing characteristics.

Another object of the invention is to provide an improved process for assembling a transducer into an integral package.

A further object of the invention is to provide an improved transducer assembly comprising integral calibration and compensation means.

Other objects of the invention will in part be obvious and will in part appear hereinafter.

SUMMARY OF THE INVENTION

In general, my sensing element comprises a relatively thin-walled, radially compliant, cylindrical ring. A load-receiving beam carrying strain gages or other similar sensors is secured to the ring along a diameter thereof. A pair of lateral tabs project out from opposite sides of the ring on an axis transverse to the beam.

A load applied to the middle of the beam causes the beam to deflect. The resulting strain energy absorbed by the beam is sensed by the gages which thereupon produce an output related to the applied load.

The fact that the ring is radially and torsionally compliant and supported only from points on an axis perpendicular to the beam has a three-fold effect on the ratio of gaged strain to applied load.

First, the radially compliant ring is able to follow the ends of the beam as they pull in during beam deflection. Consequently, the ring does not oppose the deflection and absorbs a minimum amount of the input energy, thus avoiding nonlinearity (stiffening of the beam) when the deflection is large compared to the beam thickness.

Secondly, the ring is able to twist or flex easily. As a result, the ends of the beam deflect relatively easily under the applied load so that the entire beam contributes to the overall beam deflection, i.e. the beam deflects as if its ends were simply supported.

Thirdly, the ring is relatively long (i.e. axially) and therefore, it undergoes a minimal axial deflection. This means that still more deflection energy goes into bending the beam. All three of the foregoing factors combine to minimize element size and maximize beam deflection and so also the transducer output for a given load or deflection.

The present transducer is advantaged also because spurious forces caused by ambient temperature changes are not readily transmitted to the gaging beam. That is, temperature-caused changes in ring size manifest themselves merely as changes in the eccentricity of the ring; they do not impart any substantial axial or bending stresses to the beam or otherwise affect the output of the transducer.

Thus, the utilization of an axially stiff but radially compliant ring as the sole support for the gaging beam materially increases the sensitivity and selectivity of the transducer. Yet it results in no material increase in overall cost of the unit. Moreover, the transducer with its compliant ring is better able to withstand many of the shocks imparted to it in normal use. Further, the beam and support ring can be made of materials with different coefficients of thermal expansion, giving added flexibility to the element design particularity, permitting use of "exotic" materials (sapphire, silicon) for high temperature operations.

BRIEF DESCRIPTION OF THE DRAWINGS

For a fuller understanding of the nature and objects of the invention reference should be made to the following detailed description taken in connection with the accompanying drawing, in which:

FIG. 1 is a perspective view of an improved transducer sensing element embodying the principles of my invention;

FIG. 2 is a sectional view of the FIG. 1 element in its supporting case, with some parts shown in elevation and with other parts broken away;

FIG. 3 is a bottom plan view thereof; and

FIG. 4 is a view along line 4—4 of FIG. 3;

DESCRIPTION OF THE PREFERRED EMBODIMENTS

Figure 5:
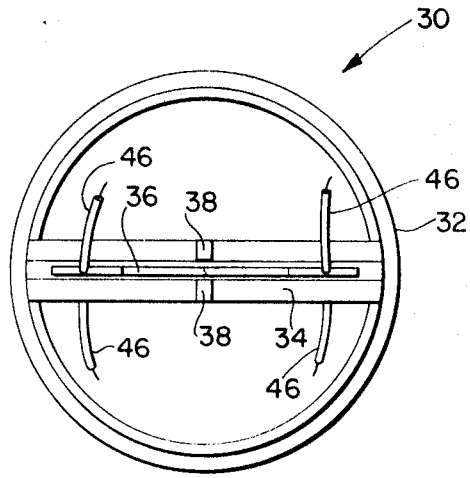
FIG. 5 is a bottom plan view of another transducer sensing element of the invention.

Referring to FIG. 1 of the drawing, my transducer is shown positioned in relation to a conventional Cartesian coordinate system having X, Y and Z axes. The transducer comprises a generally cylindrical, thin-walled, metal ring 10 whose axis coincides with the Z axis. Ring 10 is stiff in the axial or Z direction, but quite compliant, though resilient, in the radial direction, i.e. in the XY plane.

Ring 10 supports a beam 12 which is arranged along a diameter of the ring. For ease of illustration, we have shown beam 12 with its longitudinal axis coincident with the X axis. The beam ends 12a and 12b are brazed or otherwise suitably secured to ring 10 midway along its length (i.e. longitudinal axis).

The beam may be substantially rectangular, but, in the illustrated embodiment, it is tapered for reasons to be described later.

Beam 12 carries a set of strain gages 14 which are electrically connected to a conventional bridge circuit indicator (not shown). The input load $F_Z$ is applied downwardly along the Z axis to a pair of beam tabs 16 formed at the middle of the beam.

Ring 10 is rigidly anchored to the transducer body or outer case 20 (FIG. 3) by means of a pair of tabs 18 projecting out from the opposite sides of the ring. As best seen in FIG. 3, the tabs 18 are arranged on an axis oriented at right angles to the beam 12 axis, i.e. along the Y axis. A downward load $F_Z$ is applied to tabs 16 by way of the center post 20a of case 20 which is attached to the tabs as best seen in FIG. 4. The upward reactive forces opposing the downward load $F_Z$ are applied to the radially compliant ring 10 solely through its tabs 18, and thence to the ends of beam 12. Thus, while ring 10 is relatively stiff in the axial or Z direction, it is perfectly free to flex relative to the outer case 20 in the XY plane. It also twists readily.

When a downward load $F_Z$ is applied to beam 12, the beam deflects downwardly. In deflecting, beam 12 absorbs strain energy which is sensed by strain gages 14 (FIG. 1) which then produce an electrical output indicative of the load $F_Z$.

When beam 12 deflects under the applied pressure (P), the ring 10 is able to flex or twist readily. Thus, the beam ends 12a and 12b (FIG. 2) act as though they were more or less on pivots. Thus, the ring gives rise to minimum reactive forces opposing beam deflection and the end portions of the beam are quite free to deflect so that the entire beam deflects and not just the midportion thereof. Accordingly, the beam 12 need only be half as long and deflect only half as much to produce the same electrical output, as compared with a prior comparable element, assuming the same active gage length, beam cross section and material.

As shown in FIG. 3, beam 12 gradually tapers from its middle to the end of the strain gage active section. This is done to ensure constant strain over the active length of the strain gage to maximize the output thereof.

These factors, coupled with the fact that the relatively long ring 10 is stiff in the axial or Z direction, ensure that substantially all of the input energy goes into deflecting beam 12 thus maximizing the ratio of the gaged strain to the applied load.

The compliant ring 10 construction has an attendant advantage in that spurious outside forces acting on the unit merely tend to flatten ring 10 and do not materially stress beam 12 or affect the output of the unit.

More particularly, outside forces on the unit are transmitted solely through tabs 18. Therefore, they tend only to change the eccentricity of ring 10 as shown in dotted lines at 10' in FIG. 3. Consequently, the only forces transmitted to beam 12 are directed along its axis and are not sensed by gages 14. This, of course, assumes that the ring is not so distorted as to buckle beam 12.

All of the above features contribute to make a superior transducer sensing element characterized by good sensitivity, accuracy and unresponsiveness to spurious forces. Yet the transducer is still rugged, durable and relatively economical to make.

Ideally, beam 12 should be secured to ring 10 midway along the length of ring 10 as shown in the drawing. The reasons for this are two-fold. First, with beam 12 located at the geometrical center of ring 10 (i.e. on its neutral plane), the bending of beam 12 does not tend to compress or extend the ring thereby giving rise to reactive forces in the ring which could affect the output of the unit. Secondly, with that placement of the beam, radial forces on ring 10 do not tend to bend the beam also giving rise to error. However, because the effects of those two factors are quite small, in many applications, for reasons of ease of manufacture and lower cost, beam 12 may be situated at an end of ring 10.

Another pressure transducer constructed according to the invention is illustrated in FIGS. 5 through 10. This transducer is assembled and calibrated by use of a novel sequence of steps which together with a unique construction, allows significant savings in assembly costs and provides a simple, dependable arrangement for making large numbers of precisely-calibrated transducers within rigid performance limits.

Figure 5A:
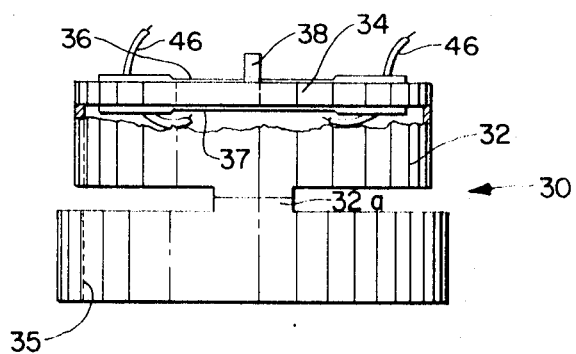
FIG. 5A is an elevational view of the sensing element of FIG. 5.
Figure 6:
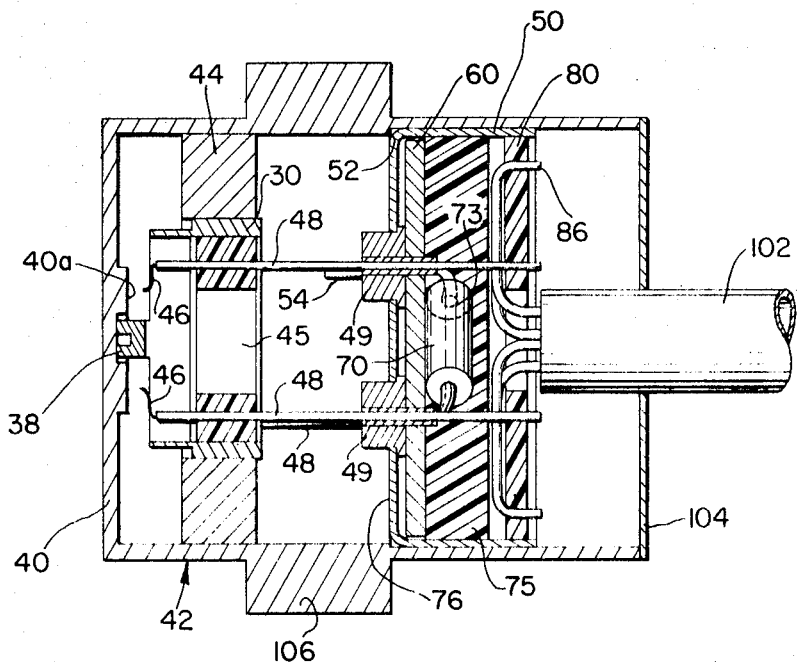
FIG. 6 is a section of a transducer comprising the sensing element of FIG. 5 and various electrical calibrating components.

Referring to FIGS. 5 and 5A, a transducer element 30 is formed of a compliant, generally cylindrical ring 32 and a flexible beam 34 secured to the ring 32. Strain gages 36 and 37 are mounted on beam 34 as best seen in FIG. 5A. A support cylinder 35 is connected to the ring 32 by a pair of small bridges 32a that serve the same supportive function as the tabs 18 of FIG. 3. Also part of beam 34 are nobs 38 which, as can be seen with reference to the assembly shown in FIG. 6, are so positioned that force exerted on the flexible metallic diaphragm 40 of a casing unit 42 will be transferred through the nobs 38 to beam 34 thereby deflecting the beam and exerting strain on gages 36 and 37. A spacer ring 44 cemented around the cylinder 35 is used to position and hold element 30, thereby achieving a good fit into casing unit 42 to which the spacer ring 44 is securely cemented. Varying sizes of spacer rings 44 are used to accommodate a single transducer element size to different casing unit diameters for different pressure ranges. In the extreme case, no spacer ring 44 is required.

Figure 7:
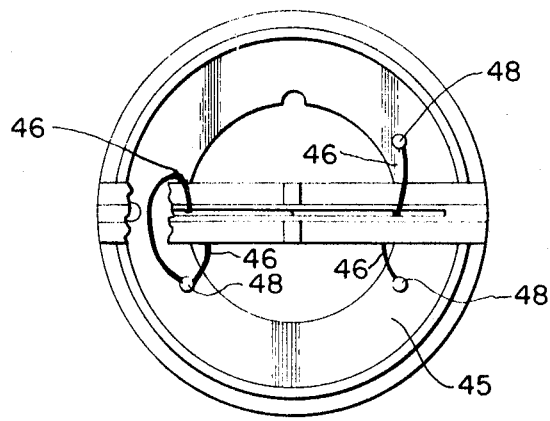
FIG. 7 is a view of the device shown in FIG. 5 showing a wire-guiding disc therewith.

A disc 45, as shown in FIGS. 6 and 7, is cemented in place within the ring 35. The disc 45 carries rigid pins 48 connected to flexible lead wires 46 from the strain gages 36 and 37 (FIGS. 5, 5A). The pins 48 protrude through feedthrough seals 49 in a cup 50 which is cemented in place against a shoulder 52 of the casing unit 42. The pins 48 also extend through, and are connected to, a printed circuit board 60. In the transducer illustrated herein, there are three pins 48 for the two strain gages 36 and 37, one of the pins serving as a common conductor for the strain gages. A fourth pin 54, similarly secured in the cup 50, also passes through the board 60.

Figure 8:
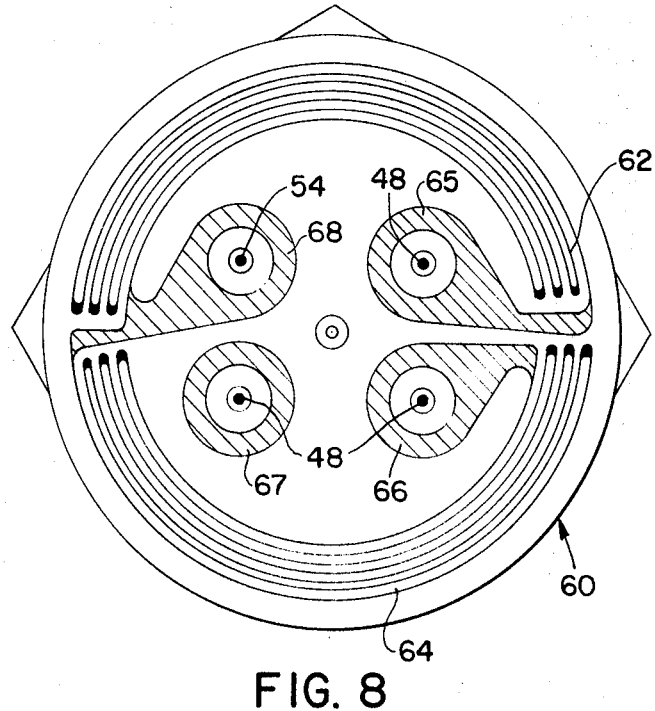
FIG. 8 is a plan view of a "printed circuit" board comprising adjustable resistance elements in balancing the transducer shown in FIG. 6.

As shown in FIG. 8, board 60 comprises two printed resistors 62 and 64 and terminals 65–68 through which the pins 48 and 54 pass and to which the pins are soldered. The pin 54 is connected to the terminal 68 joining the resistors 62 and 64; two of the pins 48 are connected to terminals 65 and 66 at the other ends of the resistors; and the remaining pin 48 is secured to the unconnected terminal 67.

Figure 9:
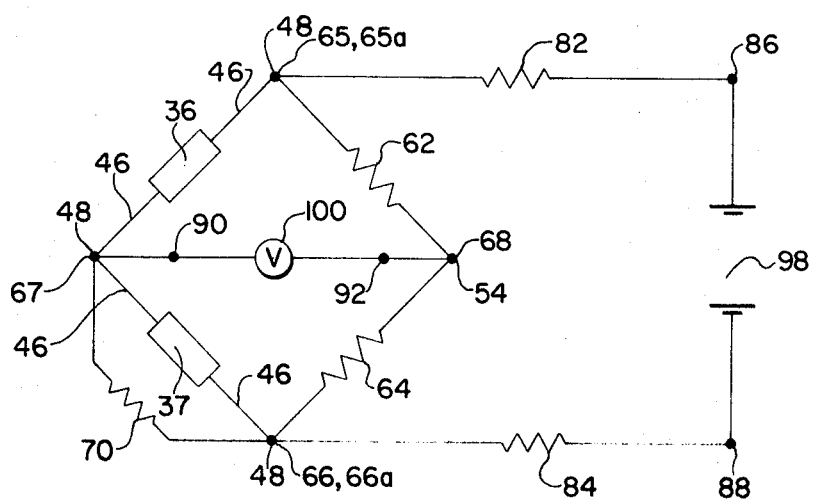
FIG. 9 is a schematic diagram of the electrical circuit incorporated in the transducer.

FIG. 9 schematically illustrates a bridge circuit comprising the strain gages 36 and 37, and resistors 62 and 64, resulting from the connections thus far described.

As shown in FIGS. 8 and 9, a temperature compensating resistor 70 may, if desired, be connected in parallel with one of the strain gages 36 and 37.

The board 60 and resistor 70 are covered with potting compound 75 and a second printed circuit board 80 is then fitted into place.

Figure 10:
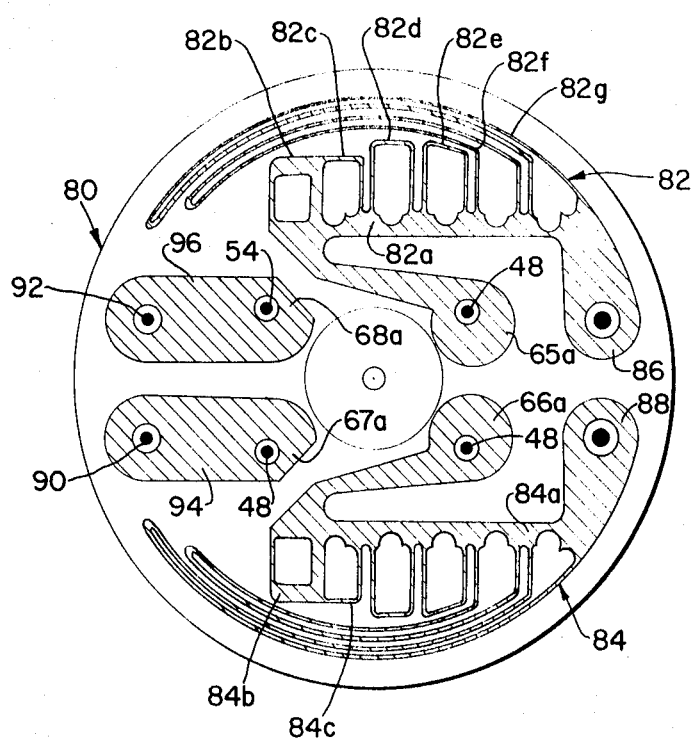
FIG. 10 is a plan view of a "printed circuit" board to carry calibration resistors.

As shown in FIG. 10, the board 80 includes printed resistors 82 and 84 connected between terminals 65a and 86 and between terminals 66a and 88, respectively. The resistor 82 has a low resistance bar 82a extending between the terminals 65a and 86, and a series of thin resistive loops 82b, 82c, etc., that branch off the bar 82a and back again. The loops 82b, etc. have different lengths and therefore different resistances. One can therefore insert a desired resistance between the terminals 65a and 86 by breaking open one or more portions of the bar 82a within selected loops 82b, etc. and therefore forcing all the current through the resistor 82 to pass through these loops. This is easily accomplished with a sharp scribing tool.

The resistor 84 is constructed in similar fashion with a bar 84a and resistive loops 84b, etc.

The board 80 is positioned with its terminals 65a–68a directly over the like numbered terminals on the board 60 and with the pins 48 and 54 passing through and soldered to the terminals 65a–68a. FIG. 9 shows the resulting connections of the resistors 82 and 84.

Still referring to FIG. 10, a pair of terminals 90 and 92 are connected to the terminals 67a and 68a by "printed circuit" conductors 94 and 96. The terminals 86, 88, 90 and 92 are used for connections to leads (not shown) that connect the transducer to a voltage source 98 (FIG. 9) and a readout device, e.g. a meter 100.

To assemble to transducer, the sensing element 30 and disc 45 are joined and the leads 46 are soldered to the pins 48. Then the element 30 and ring 40 are cemented in place as described above, with the nobs 38 also being cemented into a cuplike protrusion 40a of the diaphragm 40. Next the cup 50 is fastened in place, after which the board 60 is dropped into place and soldered to the pins 48 and 54. The resistor 70 is also connected at this time if it is to be used.

At this time the bridge circuit is balanced with a zero pressure differential across the diaphragm. With the arrangement described herein, this is very easily accomplished. The bridge circuit is temporarily connected to a power source and meter and the direction of imbalance noted. The resistance of the proper resistor 62 or 64 is then increased, merely by rubbing with an ordinary eraser until balance is obtained. The rubbing action reduces the thickness of the metallic conductor that forms the resistor.

Next the potting compound 75 is applied after which the printed circuit board 80 is dropped into place and soldered. Again the circuit is connected to a power source and meter and a known pressure differential is applied across the diaphragm 40. The resistors 82 and 84 are then adjusted as described above to provide the correct output voltage, i.e. to adjust the "span" of the transducer.

Finally, with a cable 102 (FIG. 6) connected to the board 80, an end plate 104 is secured to the casing unit 42.

The boards 60 and 80 may be keyed to the cup 50 to insure proper orientation. The casing unit 42 may be provided with an integral ring 106 to assist in positioning the transducer in various installations.

It will be readily appreciated that the foregoing arrangement permits relatively low cost manufacture of the transducer. In particular, the "hand" operations can be performed quickly by relatively unskilled personnel.

Moreover, the process by which the transducer is manufactured lends itself to ready adaptation to assembly line manufacture, eliminates unnecessary handling of the strain gage unit itself and provides maximum protection for components of the transducer during the periods in which they must be manipulated.

A particularly advantageous feature of this transducer is that a standard sensing element may be utilized in making a variety of transducers having a very wide range of operational characteristics.

It will thus be seen that the objects, set forth above, among those made apparent from the preceding description, are efficiently attained and, since certain changes may be made in the above construction without departing from the scope of the invention, it is intended that all matter contained in the above description or shown in the accompanying drawing, shall be interpreted as illustrative and not in a limiting sense.

I claim:
1. A force transducer comprising:
 (A) a radially compliant cylindrical ring,
 (B) a flexible beam
  (1) arranged along a diameter of said ring, and
  (2) having its ends secured to said ring at opposite sides thereof, and
  (3) comprising a bearing surface therealong forming means to receive a force applied proximate the center thereof and parallel to the axis of said ring, and
 (C) sole means for supporting said ring at opposite sides thereof, said supporting means being arranged along an axis perpendicular to the axis of said beam so that when said beam deflects under a load, said ring is free to follow the ends of said beam.

2. A force transducer as defined in claim 1 wherein said beam is tapered the central portion thereof being wider than the ends thereof and said wider central portion forming a bearing surface to receive an applied pressure.

3. A force transducer as defined in claim 1 wherein said supporting means comprise a pair of tabs projecting laterally at opposite sides of said ring.

4. A force transducer as defined in claim 2 wherein said beam includes a pair of extended tabs near the middle thereof through which a force is applied to said beam.

5. A force transducer as defined in claim 2 and further including strain sensors mounted on said beam, said sensors emitting an output which is indicative of the deflection of said beam.

6. A force transducer assembly comprising
 (A) a force transducer as defined in claim 1,
 (B) a transducer-containing case,
 (C) force-exerting means contacting said beam, (D) means for securing the ring of said transducer within said case,
(E) a first circuit board within said case,
(F) connecting pins
(1) electrically connected to said strain sensing means by compliant leads,
(2) extending from said element to said first circuit board, and
(3) connected to circuit elements mounted on said first board.

7. A force transducer as defined in claim 6
(A) including a second circuit board
(B) in which said pins
(1) extend through said first board to said second board, and
(2) are connected to elements on said second board.

8. A transducer as defined in claim 7
(A) wherein said first board includes first and second printed circuit resistors whose resistances are readily increased by abrasion, said pins being connected to said first and second resistors in such manner as to form a bridge circuit comprising said strain sensing means and said first and second resistors,
(B) including a further pin extending between said first and second boards,
(C) wherein said second board contains at least a third printed circuit resistor so configured that its resistance is readily altered by manual means, said pins connecting said third resistor in series with said bridge circuit.

9. A transducer as defined in claim 8
(A) wherein said case is generally cylindrical,
(B) wherein said first circuit board is disposed axally between sad sensing element and said second board,
(C) including a cup containing said boards,
(D) including means for locating said cup within said case, and
(E) wherein the pins extending between said sensing means and said first board pass through a wall of said cup.

10. In a pressure transducer of the type having a ring and a gaging beam having its ends attached to the ring only along a diameter thereof, the improvement comprising;

(A) a ring which is relatively stiff axially relatively twistable and compliant in the radial plane containing said beam, and
(B) including means for supporting said ring at points on an axis perpendicular to the axis of said beam so that as said beam deflects on application of force proximate the center thereof and along an axis parallel to the axis of said ring, said ring is free to follow the ends of said beam.

References Cited

UNITED STATES PATENTS

| | | | |
|---|---|---|---|
| 3,241,373 | 3/1966 | Ricketts et al. | 73—503 |
| 3,345,252 | 4/1966 | First et al. | 73—88.5 |
| 3,247,719 | 4/1966 | Chelner | 73—420 |
| 3,289,134 | 11/1966 | Laimins et al. | 338—4 |
| 3,290,928 | 12/1966 | Curry | 73—88.5 |
| 3,303,451 | 2/1967 | Yuan | 338—4 |
| 3,427,885 | 2/1969 | Konigsberg | 73—398 |
| 3,453,781 | 7/1969 | Greenman | 51—8 |
| 3,486,371 | 12/1969 | Dybvad et al. | 73—88 |
| 2,261,667 | 11/1941 | Stroszeck | 338—195 |
| 2,487,681 | 11/1949 | Weisselberg | 201—63 |
| 2,550,588 | 4/1951 | Oberholzer | 73—141 |
| 3,022,672 | 2/1962 | Dimeff et al. | 73—398 |
| 3,034,347 | 5/1962 | Starr | 73—141 |
| 3,071,749 | 1/1963 | Starr | 338—314 |
| 3,094,678 | 6/1963 | Eisler | 338—2 |
| 3,106,086 | 10/1963 | Hughel | 73—16 |
| 3,157,148 | 11/1964 | Reed | 114—90 |
| 3,168,718 | 2/1965 | Swartz et al. | 338—42 |
| 3,204,463 | 9/1965 | Taber | 73—398 |

FOREIGN PATENTS

| | | | |
|---|---|---|---|
| 1,421,107 | 1/1965 | France | 601 L |

RICHARD C. QUEISSER, Primary Examiner

J. WHALEN, Assistant Examiner

U.S. Cl. X.R.

73—398 AR; 338—5